(12) United States Patent
Adamson et al.

(10) Patent No.: US 6,857,598 B2
(45) Date of Patent: Feb. 22, 2005

(54) INTEGRATED HIGH-SPEED AIRCRAFT AND ASSOCIATED METHODS OF MANUFACTURE

(75) Inventors: Eric E. Adamson, Newcastle, WA (US); Paul W. Dees, Woodinville, WA (US); Edward W. Gronenthal, Renton, WA (US); Walter H. Howard, Jr., Maple Valley, WA (US); Chester P. Nelson, Kirkland, WA (US); Mithra M. Sankrithi, Lake Forest Park, WA (US); Gerhard E. Seidel, Renton, WA (US); V. Kenneth Stuhr, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/683,671

(22) Filed: Oct. 9, 2003

(65) Prior Publication Data

US 2004/0245375 A1 Dec. 9, 2004

Related U.S. Application Data

(60) Provisional application No. 60/417,885, filed on Oct. 10, 2002.

(51) Int. Cl.$^7$ .............................................. B64D 27/16
(52) U.S. Cl. ...................... 244/15; 244/119; 244/130; 244/55
(58) Field of Search .............................. 244/15, 117 R, 244/119, 118.1, 130, 54, 55, 87, 102 R, 135 R, 45 R, 118.5

(56) References Cited

U.S. PATENT DOCUMENTS 2,961,197 A * 11/1960 Hertel ........................ 244/58
3,310,262 A * 3/1967 Robins et al. ............ 244/45 R
3,447,761 A * 6/1969 Wadleigh et al. ............. 244/15
4,306,693 A * 12/1981 Cooper .................... 244/135 R
4,506,850 A * 3/1985 McConnell .................. 244/54
5,529,263 A * 6/1996 Rudolph ...................... 244/55
5,676,333 A * 10/1997 Rethorst ...................... 244/15
5,992,797 A * 11/1999 Seidel et al. ............. 244/118.5

OTHER PUBLICATIONS

Goodmanson, Lloyd T., *Transonic Transports*, 12$^{th}$ Anglo–American Aeronautical Conference, 7$^{th}$–9$^{th}$ Jul. 1971, pp. 1–11, Paper No. 72/8, Canadian Aeronautics and Space Institute, Ottawa, Canada.

Author Unknown, *Final Report–Study of the Application of Advanced Technologies to Long–Range Transport Aircraft (U)*, Advanced Transport Technology Final Results, May 1972, pp. 19, vol. I, National Aeronautics and Space Administration, Seattle, Washington.

(List continued on next page.)

*Primary Examiner*—Galen Barefoot
(74) *Attorney, Agent, or Firm*—Perkins Coie LLP

(57) ABSTRACT

Integrated high-speed aircraft, such as high-speed transport aircraft, and associated methods of manufacture. In one embodiment, a high-speed transport aircraft includes a fuselage having a first fuselage portion and a second fuselage portion positioned aft of the first fuselage portion. The first fuselage portion can have a first cross-sectional area and the second fuselage portion can have a second cross-sectional area that is less than the first cross-sectional area. The high-speed transport aircraft can further include a wing and a propulsion system. The wing can extend outwardly from the fuselage at least proximate to the second fuselage portion and can include a leading edge region and a trailing edge region. The propulsion system can include an engine nacelle fixedly attached to the wing and laterally aligned with the second fuselage portion. In one aspect of this embodiment, the engine nacelle can include an air inlet positioned aft of the leading edge region of the wing and an exhaust gas outlet positioned aft of the trailing edge region of the wing.

32 Claims, 7 Drawing Sheets

OTHER PUBLICATIONS

Williams, Bill, *Advanced Technology Transport Configuration Development*, AIAA 4th Aircraft Design, Flight Test, and Operations Meeting, AIAA Paper No. 72–756, Aug. 7–9, 1972, pp. 1–13, American Institute of Aeronautics and Astronautics, Los Angeles, California.

Kulfan, R.M. et al., *Final Report–High Transonic Speed Transport Aircraft Study*, NASA–CR–114658, Sep. 1973, 2 pp., National Aeronautics and Space Administration, Moffett Field, California.

Nelson, Chester P., *High Speed Civil Transport Flight Research Requirements*, NASA HSR Systems Study #NAS1–19360 Task Assignment No. 7, Mar. 31, 1995, 3 pp., The Boeing Company, Seattle, Washington.

* cited by examiner

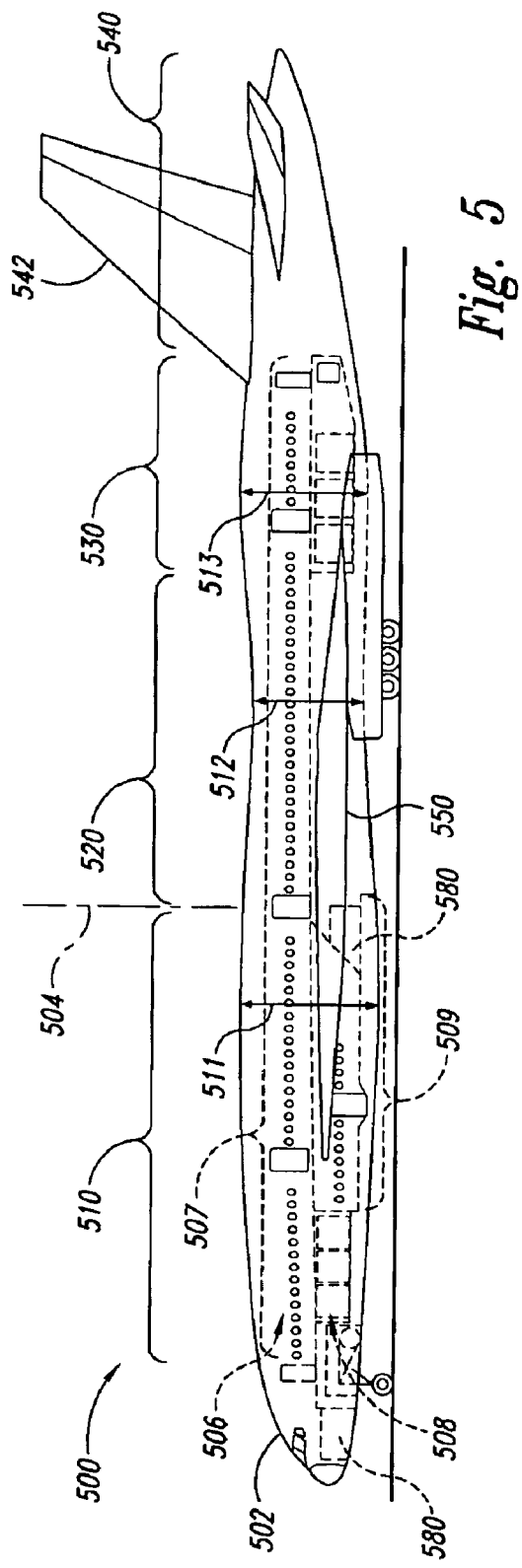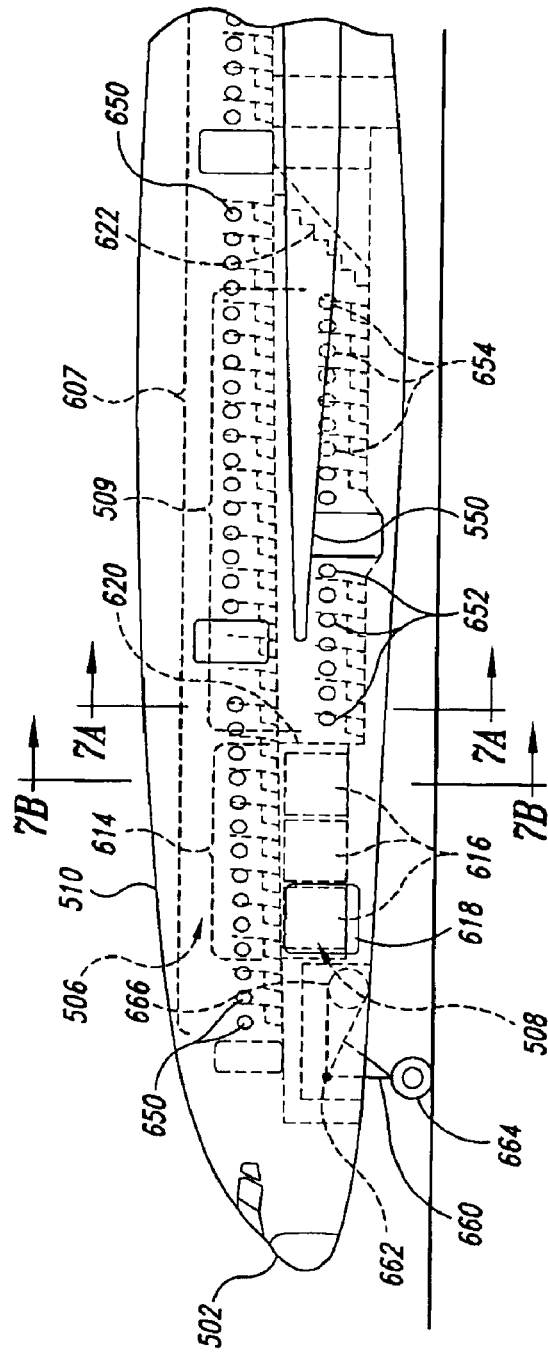

INTEGRATED HIGH-SPEED AIRCRAFT AND ASSOCIATED METHODS OF MANUFACTURE

CROSS-REFERENCE TO RELATED APPLICATION(S)

This application claims the benefit of pending U.S. Provisional Patent Application Ser. No. 60/417,885, filed Oct. 10, 2002. This application discloses related subject matter to pending U.S. patent application Ser. No. 10/278,633, filed Oct. 22, 2002, now U.S. Pat. No. 6,679,452 and pending U.S. patent application Ser. No. 10/278,717, filed Oct. 22, 2002, now U.S. Pat. No. 6,772,977 each of which is incorporated herein in its entirety by reference.

TECHNICAL FIELD

The following disclosure relates generally to high-speed aircraft and, more particularly, to integrated high-speed transport aircraft.

BACKGROUND

Commercial transport aircraft typically operate at cruise Mach numbers of about 0.85 or less. Although transporting passengers and cargo at higher speeds, such as transonic or supersonic speeds, can reduce travel time and increase revenue, flying at these speeds requires significantly more thrust. To generate more thrust, conventional transonic and supersonic aircraft typically use low bypass ratio turbofan engines or straight turbojet engines. These engine configurations generally have a high specific fuel consumption at cruise conditions that outweighs any increase in aerodynamic efficiency they may offer. This fuel consumption results in a net fuel efficiency for transonic and supersonic aircraft that is significantly lower than that of comparably sized subsonic aircraft. In addition, this low fuel efficiency can unfavorably increase atmospheric emissions.

Conventional transonic and supersonic aircraft engines typically operate at very high jet velocities when generating thrust for takeoff. These velocities can cause significant noise in airports and surrounding communities. One approach to reducing this noise is to lengthen the engine inlet and nozzle ducts and integrate noise abatement features with the ducts. One drawback to this approach is that such features typically increase the weight of the propulsion system, which in turn increases the structural loads on the wing and the susceptibility of the aircraft to wing flutter. Strengthening the wings to carry such additional loads results in increased structural weight, which further tends to increase the aerodynamic drag of the aircraft. Such an increase in aerodynamic drag increases fuel consumption, which in turn increases the amount of fuel that must be carried by the aircraft. Increasing the fuel capacity, however, further increases the structural weight of the aircraft, causing the design cycle to repeat.

Conventional commercial transport aircraft typically include a passenger cabin on an upper deck and a cargo hold on a lower deck. This configuration allows airlines to generate revenue by transporting both passengers and cargo over selected routes. On some routes, however, there may be a greater demand for passenger transport than cargo transport. On these routes, the airlines may accordingly prefer to use some of the space on the lower cargo deck for additional passenger seating.

One problem with adding passenger seating and/or other passenger facilities to lower decks is that lower decks typically provide insufficient standing height for passengers and crew. Another problem with using lower decks in this manner is that aircraft typically provide insufficient structure beneath lower-deck passenger seats to protect the passengers in the event of an impact such as a crash landing. Current regulations, for example, require at least 30 inches of compressible structure beneath a lower deck if the lower deck is to be used for passengers.

Many aircraft have retractable landing gears attached to their wings. These landing gears generally are movable between a static deployed position for supporting the aircraft on the ground and a static retracted position for reducing aerodynamic drag during flight. Because of high landing loads, these landing gears typically are attached to the wings with a substantial support structure. In addition to being very strong, such a support structure must also accommodate movement of the landing gear between the static deployed and static retracted positions.

Some conventional wing-mounted landing gears are pivotally attached between a rear wing span and a beam extending from the fuselage to the rear wing spar. Typically, the beam must be relatively large, and hence relatively heavy, in order to carry the high landing loads. One drawback to this approach is that the additional weight of the beam can adversely affect aircraft performance.

Other landing gears are attached to wings with a cantilevered beam extending aft of the rear wing spar. The cantilevered beam typically includes an aft trunnion support that is laterally offset from the beam centerline and configured to pivotally support an aft trunnion of the landing gear. One shortcoming associated with the cantilevered beam approach is that the lateral offset results in significant torsional loading of the cantilevered beam during landing. As a result, the cantilevered beam must be relatively large, and hence relatively heavy, in order to carry the torsional load without failure. As mentioned above, such additional weight can adversely affect aircraft performance.

SUMMARY

Aspects of the invention are directed to aircraft, such as integrated high-speed transport aircraft, and associated methods of manufacture. In one aspect, an aircraft includes a fuselage, a wing, and a propulsion system. The fuselage can include a first fuselage portion, a second fuselage portion positioned aft of the first fuselage portion, and a third fuselage portion positioned aft of the second fuselage portion. The first fuselage portion can have a first cross-sectional area, the second fuselage portion can have a second cross-sectional area that is less than the first cross-sectional area, and the third fuselage portion can have a third cross-sectional area that is greater than the second cross-sectional area. The wing can be fixedly attached to the fuselage and extend outwardly from a position at least proximate to the second fuselage portion. The propulsion system can be fixedly attached to the wing and can include an air inlet positioned aft of a leading edge region of the wing.

In another aspect of the invention, a method for manufacturing an aircraft includes providing a first fuselage portion having a first cross-sectional area, and attaching a second fuselage portion to the first fuselage portion aft of the first fuselage portion. The second fuselage portion can have a second cross-sectional area that is less than the first cross-sectional area. The method can further include attaching a third fuselage portion to the second fuselage portion aft of the second fuselage portion. The third fuselage portion can have a third cross-sectional area that is greater than the second cross-sectional area. The method can further include attaching a wing at least proximate to the second fuselage portion, and attaching a propulsion system to the wing. The wing can have a leading edge region, and the propulsion system can have an air inlet positioned aft of the leading edge region of the wing.

BRIEF DESCRIPTION OF THE DRAWINGS

FIG. 5 is a partially hidden, side elevation view of an aircraft having a lower deck configured in accordance with another embodiment of the invention.

FIG. 6 is a partially hidden, enlarged side elevation view of a forward portion of the fuselage shown in FIG. 5 configured in accordance with an embodiment of the invention.

DETAILED DESCRIPTION

Figure 1:
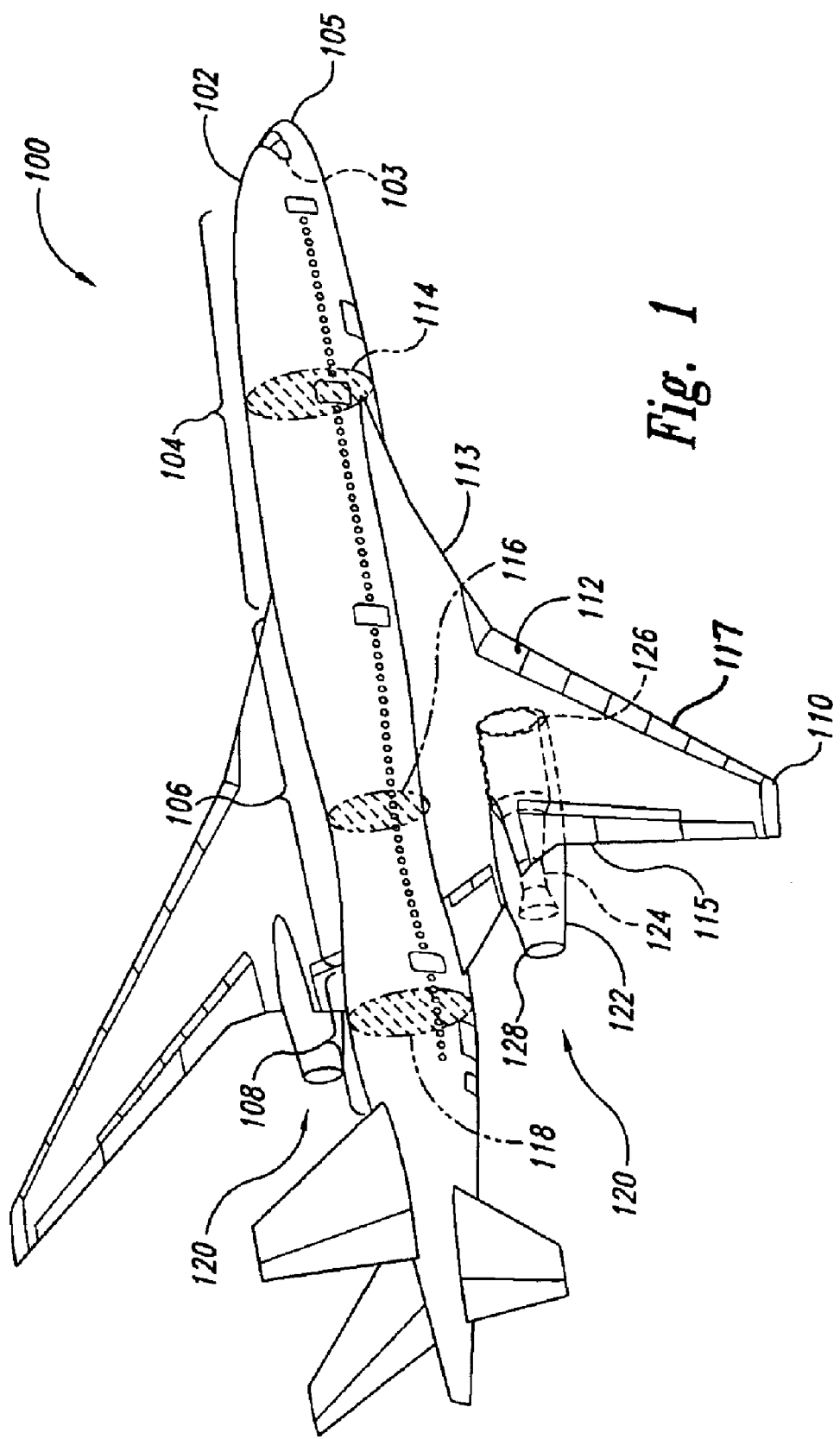
FIG. 1 is a partially hidden, top isometric view of an aircraft configured in accordance with an embodiment of the invention.
Figure 2:
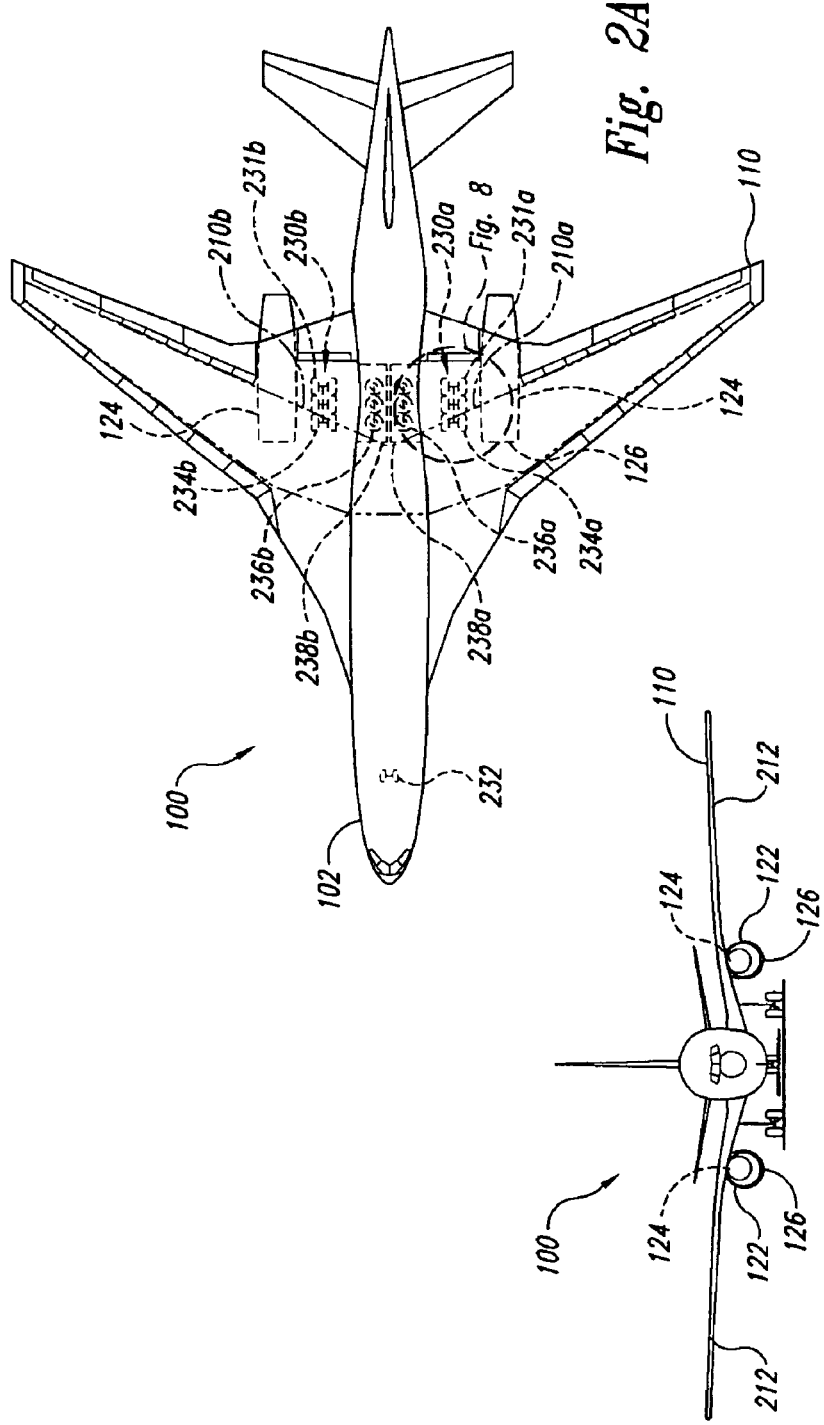
FIGS. 2A–2C are top, front, and side views, respectively, of the aircraft of FIG. 1 configured in accordance with embodiments of the invention.

The following disclosure describes aircraft, such as integrated high-speed transport aircraft, and associated methods of manufacture. Certain specific details are set forth in the following description and in FIGS. 1–9 to provide a thorough understanding of various embodiments of the invention. Other details of well-known structures and systems often associated with aircraft are not set forth in the following disclosure, however, to avoid unnecessarily obscuring the various embodiments of the invention. Further, those of ordinary skill in the relevant art will understand that they can practice other embodiments of the invention without several of the details described below.

In the drawings, identical reference numbers identify identical or at least generally similar elements. To facilitate the discussion of any particular element, the most significant digit or digits of any reference number refer to the Figure in which the element is first introduced. For example, element 110 is first introduced and discussed with reference to FIG. 1.

FIG. 1 is a partially hidden, top isometric view of an aircraft 100 configured in accordance with an embodiment of the invention. In one aspect of this embodiment, the aircraft 100 includes a fuselage 102 and a wing 110 extending outwardly from the fuselage 102. The fuselage 102 can include a first fuselage portion 104, a second fuselage portion 106 positioned aft of the first fuselage portion 104, and a third fuselage portion 108 positioned aft of the second fuselage portion 106. The wing 110 can be fixedly attached to the fuselage 102 at least proximate to the second fuselage portion 106, and can include a leading edge region 112 and a trailing edge region 115. The leading edge region 112 can include a leading edge 117. The wing 110 can further include an inboard strake or leading edge extension 113 extending forward from the leading edge 117 to the fuselage 102.

In another aspect of this embodiment, the first fuselage portion 104 can have a first cross-sectional area 114, the second fuselage portion 106 can have a second cross-sectional area 116 that is less than the first cross-sectional area 114, and the third fuselage portion 108 can have a third cross-sectional area 118 that is greater than the second cross-sectional area 116. In other embodiments, the fuselage 102 can have other shapes. For example, in another embodiment, the third fuselage portion 108 can have a cross-sectional area that is at least approximately equal to or less than the cross-sectional area of the second fuselage portion 106. Accordingly, in this other embodiment, the fuselage 102 can have a narrowing taper as it extends aft from the first fuselage portion 104.

In a further aspect of this embodiment, the aircraft 100 includes a propulsion system 120 configured to propel the aircraft 100 at cruise Mach numbers of about 0.98 or less. The propulsion system 120 can include an engine nacelle 122 housing an engine 124. The engine nacelle 122 can include an air inlet 126 positioned forward of the engine 124, and an exhaust gas outlet 128 positioned aft of the engine 124. In yet another aspect of this embodiment, the air inlet 126 is positioned aft of the leading edge region 112 of the wing 110, and the exhaust gas outlet 128 is positioned aft of the trailing edge region 115. In the illustrated embodiment, the air inlet 126 is positioned aft of the leading edge 117 of the wing 110.

In other embodiments, the aircraft 100 can include other propulsion systems without departing from the spirit or scope of the present invention. For example, in another embodiment, the aircraft 100 can include a propulsion system having an engine nacelle with an exhaust gas outlet positioned forward of the trailing edge region 115 of the wing 110. Alternatively, in a further embodiment, the aircraft 100 can include a propulsion system having an engine nacelle with an air inlet positioned forward of the leading edge region 112 of the wing 110. In yet other embodiments, the aircraft 100 can include engine nacelles integrated with the wing 110 or mounted to the fuselage 102.

In yet another aspect of this embodiment, the fuselage 102 includes a flight deck 103 positioned within a nose portion 105. The nose portion 105 can be relatively blunt to provide satisfactory pilot visibility and an efficient flight deck layout while still providing low aerodynamic drag characteristics for flight at, for example, near-sonic or transonic speeds.

One feature of embodiments of the invention shown in FIG. 1 is that the shape of the fuselage 102 and the relative placement of the propulsion system 120 provides the aircraft 100 with a generally smooth, gradually changing, cross-sectional area distribution, such as a monotonically changing cross-sectional area distribution. One advantage of this feature is that the aircraft 100 generates relatively low transonic wave drag at near-sonic speeds in accordance with the area rule. In other embodiments, external fairing and/or other structural features can be attached outside the fuselage pressure vessel to provide the aircraft 100 with a monotonically changing cross-sectional area distribution. Another feature of embodiments of the invention shown in FIG. 1 is that the inboard leading edge extension 113 reduces the thickness-to-cord ratio of the wing 110 proximate to the wing root. Advantages of this feature include reduced aerodynamic drag, lower wing bending loads, and improved area ruling.

FIGS. 2A–2C are top, front, and side views, respectively, of the aircraft 100 of FIG. 1 configured in accordance with embodiments of the invention. Referring first to FIG. 2A, in one aspect of this embodiment, the aircraft 100 includes a nose gear 232 pivotally attached to the fuselage 102, and main gears 230 (identified individually as a first main gear 230a and a second main gear 230b) pivotally attached to the wing 110. The main gears 230a and 230b can be structurally integrated with wing spar boxes 210a and 210b, respectively, and can include wheel trucks 231a and 231b, respectively. The wheel trucks 231a and 231b can be movable between static deployed positions 234a and 234b, respectively, for supporting the aircraft 100 on the ground, and static retracted positions 236a and 236b, respectively, for reducing aerodynamic drag in flight. In the deployed static positions 234, the wheel trucks 231 can be positioned aft of the engine inlets 126 to reduce the possibility of line-of-sight ingestion of foreign objects into the engine nacelles 124. In the static retracted positions 236, the wheel trucks 231a and 231b can be stowed in wheel wells 238a and 238b, respectively, positioned in a lower region of the second fuselage portion 106 of FIG. 1. An advantage of this feature is that wider portions of the fuselage 102 can be reserved for carrying cargo containers.

Referring next to FIG. 2B, in one aspect of this embodiment, the engine inlets 126 are integrated with lower surfaces 212 of the wing 110. One advantage of this feature is that the static pressure of the flow field under the wing 110 is relatively high, improving the quality of airflow to the engines 124. A further advantage of this feature is that the aerodynamic interaction between the nacelles 122 and the lower wing surface 212 can provide additional aerodynamic benefits to the aircraft 100, including increased lift.

Referring next to FIG. 2C, in one aspect of this embodiment, the fuselage 102 includes a plurality of personnel doors 202 (shown as a first personnel door 202a, a second personnel door 202b, a third personnel door 202c, a fourth personnel door 202d, and a fifth personnel door 202e) and a plurality of cargo doors 204 (shown as a first cargo door 204a and a second cargo door 204b). In one embodiment, the personnel doors 202a and 202e can be galley service doors, and the personnel doors 202c–e can be passenger doors. The galley service doors 202a, 202e can be positioned on only one side of the fuselage 102, while the passenger doors 202b–d can be positioned in pairs on both sides of the fuselage 102. The configuration of the fuselage 102 can allow positioning of the various personnel doors 202 ahead of, over, and behind the wing 110. In addition, the configuration of the fuselage 102 can further allow positioning of the cargo doors 204 both forward and aft of the wing 110. In other embodiments, the aircraft 100 can include other passenger, crew, service, and cargo door positions and configurations. For example, in another embodiment, the aircraft 100 can include an additional galley service door forward of the wing 110 and/or an additional galley service door aft of the wing 110.

Figure 3:
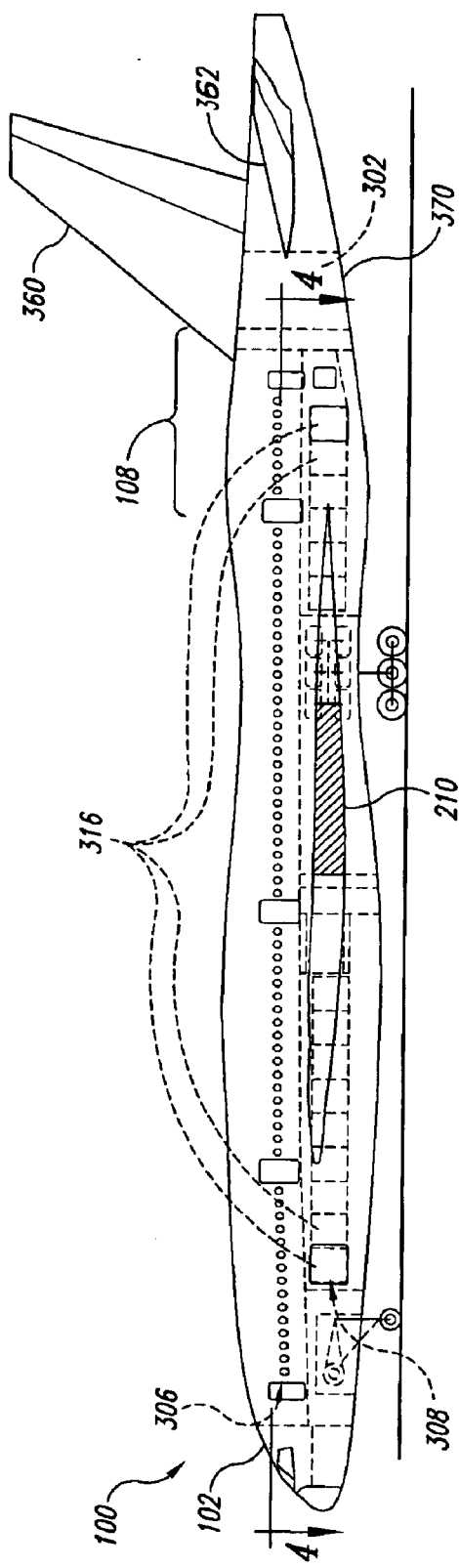
FIG. 3 is a partially hidden, side elevation view of the aircraft of FIGS. 1–2C configured in accordance with an embodiment of the invention.

FIG. 3 is a partially hidden, side elevation view of the aircraft 100 illustrating aspects of the fuselage 102 configured in accordance with embodiments of the invention. The engine nacelles 122 have been removed from FIG. 3 for purposes of clarity. In one aspect of this embodiment, the fuselage 102 includes an upper deck 306 and a lower deck 308. The lower deck 308 can be configured to carry a plurality of cargo containers 316, such as LD-2 or LD-3 unit load devices (ULDs), positioned side-by-side. The cargo containers 316 can be arranged longitudinally on the lower deck 308 both fore and aft of the wing spar box 210. As explained in greater detail below, in other embodiments, the lower deck 308 can be configured to carry passengers or passengers and cargo.

In a further aspect of this embodiment, the aircraft 100 includes a horizontal stabilizer 362 and a vertical stabilizer 360 extending outwardly from at least proximate the third fuselage portion 108. The horizontal stabilizer 362 can be longitudinally staggered aft of the vertical stabilizer 360. Longitudinally staggering the horizontal stabilizer 362 relative to the vertical stabilizer 360 in this manner can provide a further mechanism for area-ruling the aircraft 100 to reduce the aerodynamic drag of the aircraft 100 at near-sonic Mach numbers.

In another aspect of this embodiment, the fuselage 102 includes an optional fuel tank 302 positioned at least proximate to the third fuselage portion 108. Positioning the optional fuel tank 302 in this portion of the fuselage 102 can efficiently utilize the unpressurized volume under the vertical stabilizer 360. Further, the optional fuel tank 302 can provide a means for actively managing the C.G. position of the aircraft 100 to broaden the required C.G. limits, reduce aircraft empty weight, and reduce aerodynamic trim drag. In a further aspect of this embodiment, the aircraft 100 can include an optional electronic and/or physical tail skid 370 positioned at least generally aft of the third fuselage portion 108.

Figure 4:
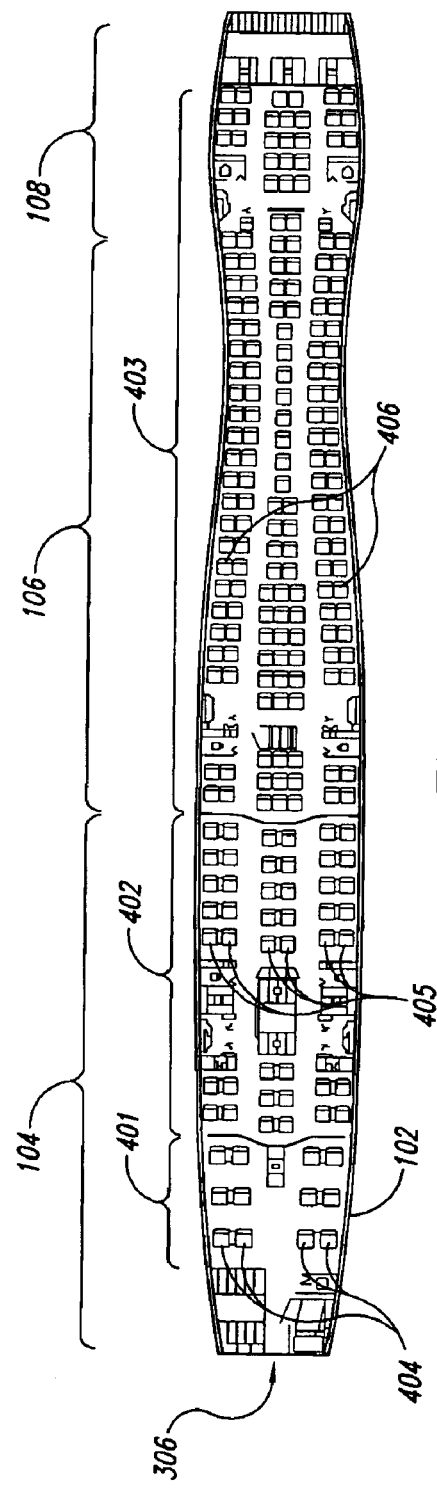
FIG. 4 is a top cross-sectional view taken substantially along line 4—4 in FIG. 3 showing an upper deck portion of a fuselage configured in accordance with an embodiment of the invention.

FIG. 4 is a top cross-sectional view taken substantially along line 4—4 in FIG. 3 showing the upper deck 306 of the fuselage 102 configured in accordance with an embodiment of the invention. In one aspect of this embodiment, the upper deck 306 includes a tri-class interior arrangement with a first-class seat section 401 and a business-class seat section 402 positioned within the first fuselage portion 104, and an economy-class seat section 403 positioned within the second fuselage portion 106 and the third fuselage portion 108. The first-class seat section 401 can include seating rows having four first-class seats 404 arranged in two groups of two each on either side of a central passenger aisle. The first-class seats 404 can be about 57 inches wide when positioned two abreast. The business-class seat section 402 can include seating rows having six business-class seats 405 arranged in three groups of two separated by left and right passenger aisles. The business-class seats 405 can be about 53 inches wide when positioned two abreast. The economy-class seat section 403 can include seating rows having from five to seven economy-class seats 406 arranged into two outer groups of two seats and a central group of one to three seats separated by left and right passenger aisles. The economy-class seats 406 can be about 43 inches wide when positioned two abreast. In other embodiments, the upper deck 306 can have other passenger seat arrangements. For example, in another embodiment, the upper deck 306 can include a single-aisle passenger seat arrangement.

One feature of embodiments of the invention shown in FIG. 4 is that the first-class seat section 401 and the business-class seat section 402 are positioned in the first fuselage portion 104. One advantage of this feature is that the first fuselage portion 104 generally has more cross-sectional area than the second fuselage portion 106 and, accordingly, provides additional space and comfort to the first-class and business-class passengers who pay higher fares than the economy-class passengers. In addition, unlike conventional aircraft, where all of the window seats offer an equal amount of clearance space to the sidewall of the aircraft, the upper deck 306 of the present invention provides many window seats offering extra space to the sidewall by taking advantage of the curved, area-ruled shape of the fuselage 102.

FIG. 5 is a partially hidden, side elevation view of an aircraft 500 having a fuselage 502 with a multipurpose lower deck 508 configured in accordance with another embodiment of the invention. In one aspect of this embodiment, the fuselage 502 includes a first fuselage portion 510, a second fuselage portion 520 positioned aft of the first fuselage portion 510, and a third fuselage portion 530 positioned aft of the second fuselage portion 520. The aircraft 500 can further include a wing 550 positioned at least proximate to the second fuselage portion 520, and an empennage portion 540 positioned aft of the third fuselage portion 530. The empennage portion 540 can include a vertical stabilizer 542 for controlling motion of the aircraft 500 in flight about a yaw axis 504.

In another aspect of this embodiment, the fuselage 502 is area-ruled to reduce transonic wave drag. For example, the first fuselage portion 510 can have a first dimension 511 at least approximately parallel to the yaw axis 504, the second fuselage portion 520 can have a second dimension 512 at least approximately parallel to the yaw axis 504 and less than the first dimension 51 1, and the third fuselage portion 530 can have a third dimension 513 at least approximately parallel to the yaw axis 504 and greater than the second dimension 512.

In a further aspect of this embodiment, the fuselage 502 includes an upper deck 506 having a first passenger portion 507 configured to accommodate passengers (not shown). The upper deck 506 can extend within the first fuselage portion 510, the second fuselage portion 520, and the third fuselage portion 530. The multipurpose lower deck 508 can extend at least within the first fuselage portion 510 beneath the upper deck 506 and can include a second passenger portion 509 configured to accommodate passengers. In this embodiment, the lower deck 508 is advantageously positioned in the portion of the fuselage 502 that has additional space due to area-ruling.

In a further aspect of this embodiment, the aircraft 500 can include optional crew rest areas 580 positioned in the forward portion of the lower deck 508 or the aft portion of the lower deck 508. In another embodiment, the aircraft 500 can include optional crew rest areas in the upper deck 506 or in the above-cabin crown areas forward or aft on the upper deck 506 where the cross-sectional area of the fuselage 502 is greatest due to area-ruling.

FIG. 6 is a partially hidden, enlarged side elevation view of the first fuselage portion 510 showing the lower deck 508 configured in accordance with an embodiment of the invention. In one aspect of this embodiment, the lower deck 508 further includes a cargo portion 614 positioned forward of the second passenger portion 509. The cargo portion 614 can be configured to carry cargo containers 616, such as LD-2 or LD-3 ULDs, and/or other palletized cargo. The first fuselage portion 510 can include a cargo door 618 positioned adjacent to the cargo portion 614 for moving the cargo containers 616 into and out of the cargo portion 614.

In another aspect of this embodiment, the lower deck 508 further includes a separator 620 extending between the cargo portion 614 and the second passenger portion 509. The separator 620 can be a rigid or semi-rigid structure providing a barrier between the cargo portion 614 and the second passenger portion 509. In other embodiments, the separator 620 can be a flexible structure such as a cargo net. In a further aspect of this embodiment, the separator 620 is selectively positionable at different longitudinal stations of the lower deck 508. In this way, the relative sizes of the cargo portion 614 and the second passenger portion 509 can be adjusted to accommodate different cargo and passenger loading scenarios. In other embodiments, the longitudinal station of the separator 620 can be at least generally non-adjustable.

In a further aspect of this embodiment, the first fuselage portion 510 includes a first row of passenger windows 650 positioned adjacent to the upper deck 506, and a second row of passenger windows 652 positioned adjacent to the lower deck 508. The second row of passenger windows 652 extends only partially aft relative to the second passenger portion 509 because it is blocked by the wing 550. To provide passengers seated in the aft part of the second passenger portion 509 with a view out of the aircraft, the first fuselage portion 510 can include a row of simulated external-view windows 654 extending aft from the second row of passenger windows 652 adjacent to the wing 550. The simulated external-view windows 654 can include "virtual window technology" such as video displays that simulate conventional external-view windows and provide passengers seated adjacent to the wing 550 with a simulated view out of the second passenger portion 509. In other embodiments, the simulated external-view windows 654 can be omitted.

In a further aspect of this embodiment, the first fuselage portion 510 includes a stairway 622 extending between the upper deck 506 and the lower deck 508 to accommodate passenger travel between the first passenger portion 507 and the second passenger portion 509. In other embodiments, the first fuselage portion 510 can include other types of passageways for passenger travel between the upper deck 506 and the lower deck 508. For example, in another embodiment, the first fuselage portion 510 can include an elevator. In further embodiments, the first fuselage portion can include an escalator or a ladder.

In still another aspect of this embodiment, the first fuselage portion 510 includes an aft-retracting landing gear 660 housed in a wheel well 666 positioned forward of the lower deck 508. After takeoff, the landing gear 660 can pivot rearwardly and upwardly about a trunnion 662 to move a wheel truck 664 from a static deployed position (shown in FIG. 6) to a static retracted position within the wheel well 666. Positioning the trunnion 662 in a forward portion of the wheel well 666 can cause the landing gear 660 to collapse into the wheel well 666 in the event of a landing gear collapse, thus avoiding damage to the lower deck 508. In other embodiments, however, the landing gear 660 can retract in other directions. For example, in another embodiment, the landing gear 660 can retract forward into an appropriately configured wheel well. In a further embodiment, the landing gear 660 can retract sideways into an appropriately configured wheel well.

One feature of embodiments of the invention shown in FIGS. 5–6 is that the first fuselage portion 510 requires additional cross-sectional space to accommodate the second passenger portion 509. One advantage of this feature is that the additional cross-sectional space can be utilized to provide the aircraft 500 with a generally smooth and gradual cross-sectional area distribution for reducing wave drag at transonic speeds in accordance with the area rule.

Figure 7A:
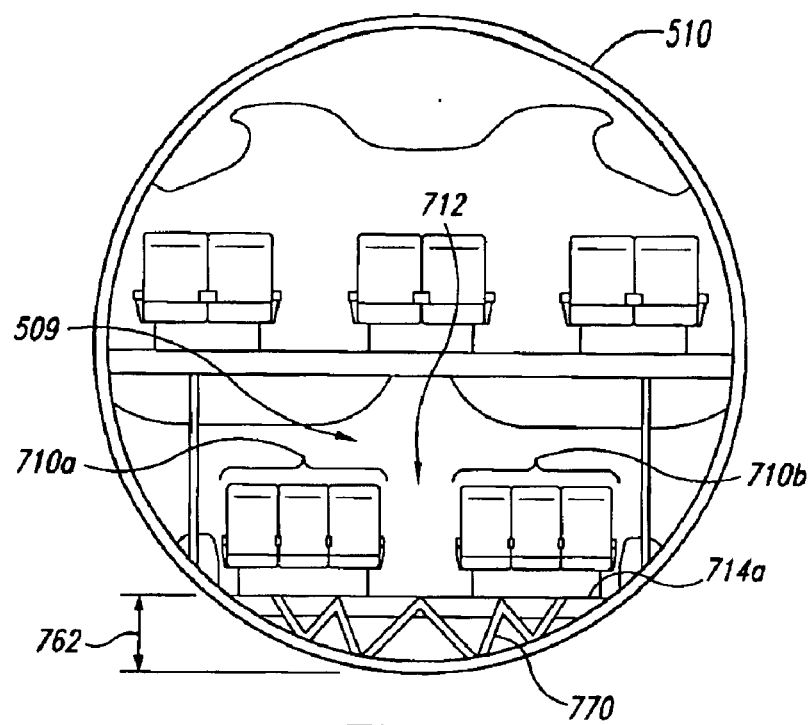
FIGS. 7A–7B are enlarged cross-sectional elevation views taken substantially along lines 7A—7A and 7B—7B in FIG. 6, respectively, showing the forward fuselage portion configured in accordance with embodiments of the invention.
Figure 7B:
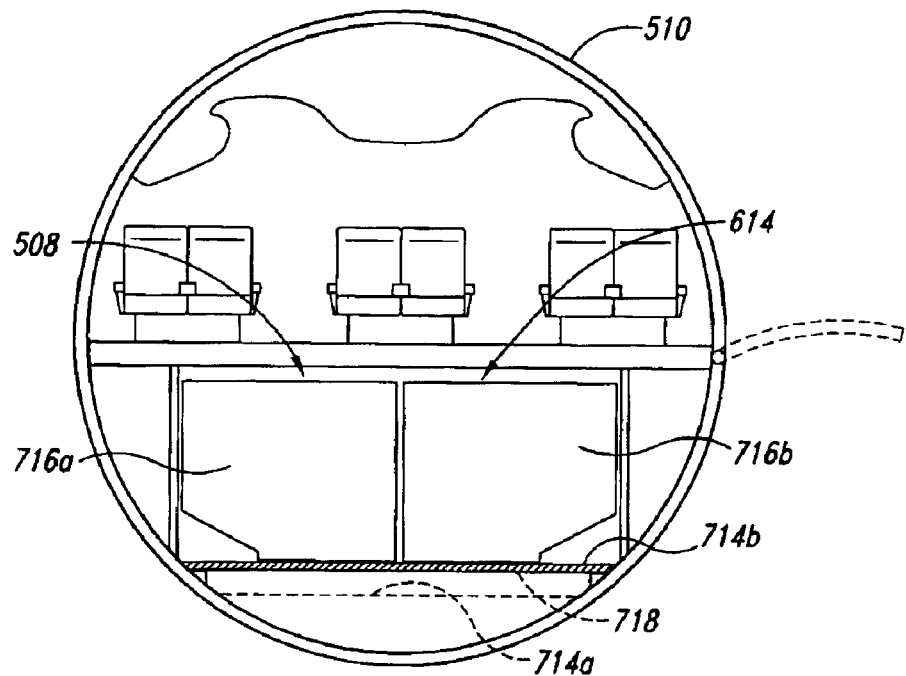

FIGS. 7A–7B are enlarged cross-sectional views of the first fuselage portion 510 taken substantially along lines 7A—7A and 7B—7B, respectively, in FIG. 6. Referring first to FIG. 7A, in one aspect of this embodiment, the second passenger portion 509 includes a first passenger seat section 710a and a second passenger seat section 710b positioned on opposite sides of a central passenger aisle 712. In the illustrated embodiment, each passenger seat section 710 includes three-abreast passenger seating. In other embodiments, the second passenger portion 509 can include other passenger seat arrangements. For example, in another embodiment, the passenger aisle 712 can be positioned off-center and the second passenger portion 509 can include two-abreast passenger seating on one side of the passenger aisle 712 and four-abreast passenger seating on the other. In a further embodiment, the second passenger portion 509 can include two passenger aisles separating three passenger seat sections. In this further embodiment, each passenger seat section can include two-abreast passenger seating. In still other embodiments, the second passenger portion 509 can include still other passenger seat arrangements, depending on factors such as fuselage, aisle, and/or seat width.

In another aspect of this embodiment, the second passenger portion 509 includes a first floor 714a positioned above an energy-absorbing structure 770. The energy-absorbing structure 770 can be configured to absorb the energy from an impact to the bottom of the first fuselage portion 510. Such an impact could occur, for example, during an emergency landing. The first floor 714a can be spaced apart from the bottom of the first fuselage portion 510 by a distance 762. In a further aspect of this embodiment, the distance 762 can be equal to about 30 inches. In other embodiments, the distance 762 can have other values. For example, in another embodiment, the distance 762 can be about 36 inches. In a further embodiment, the distance 762 can be about 24 inches. In still other embodiments, the distance 762 can have still other values, depending on factors such as the energy-absorbing capability of the energy-absorbing structure 770 or the requirements of applicable regulations.

Referring next to FIG. 7B, in one aspect of this embodiment, the cargo portion 614 is configured to carry cargo containers, such as LD-3 cargo containers 716a and 716b, in a side-by-side arrangement. In other embodiments, the cargo portion 614 can be configured to carry other types of containerized cargo. For example, in another embodiment, the cargo portion 614 can be configured to carry LD-2 or LD-1 cargo containers in two-abreast or other arrangements. In further embodiments, the cargo portion 614 can be configured to carry palletized cargo or palletized cargo and standard ULDs.

In a further aspect of this embodiment, the cargo portion 614 can include a second floor 714b positioned above the first floor 714a, if required to accommodate the cargo containers 716a and 716b. The second floor 714b can include floor inserts 718 removably installed across the lower deck 508. Accordingly, use of the removable floor inserts 718 and the movable separator 620 (FIG. 6) enables the lower deck 508 to be selectively configured to carry cargo, passengers, or cargo and passengers in different proportions.

Figure 8:
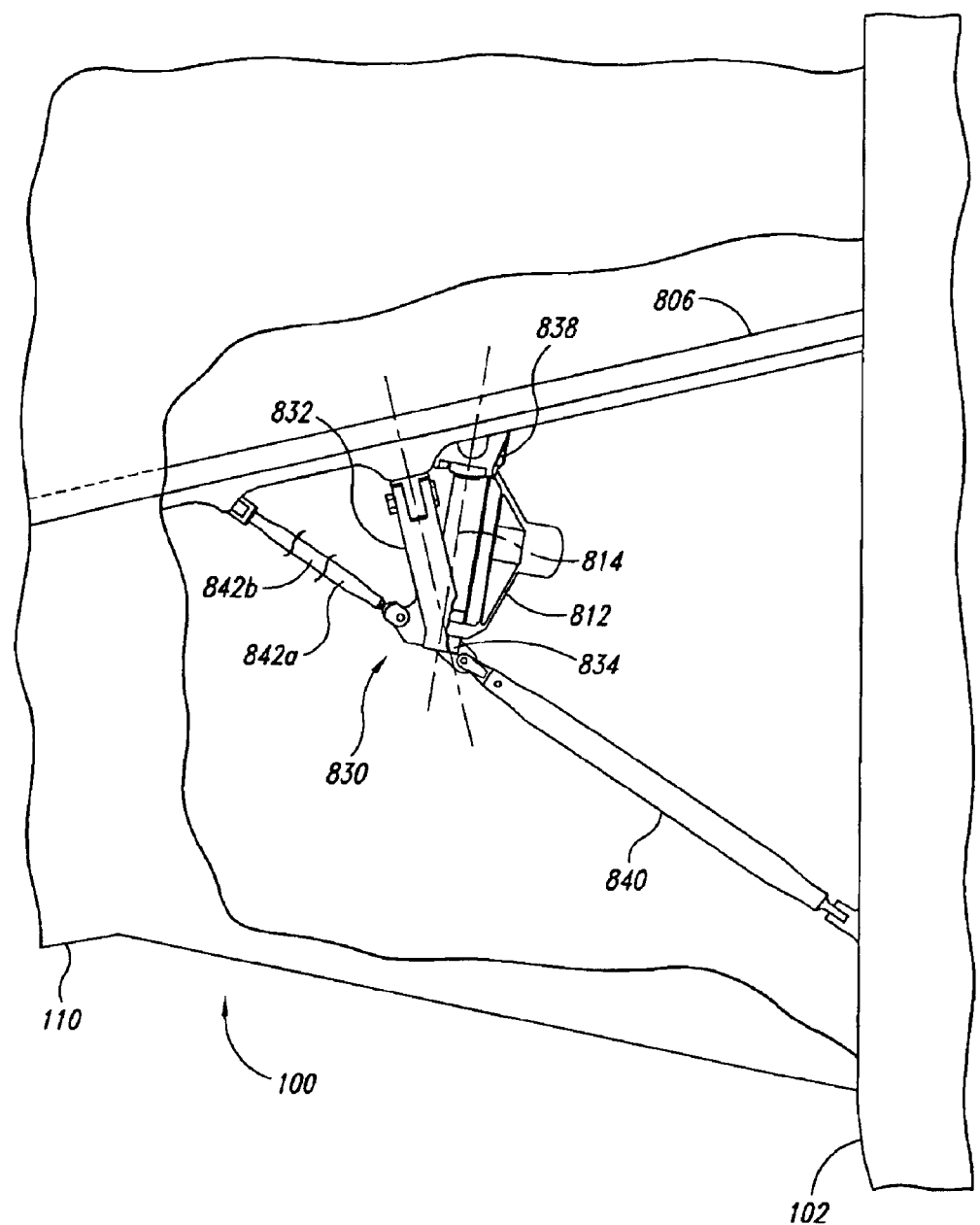
FIG. 8 is a top cutaway view taken from FIG. 2A of a portion of a wing having a landing gear support assembly configured in accordance with an embodiment of the invention.

FIG. 8 is a top cutaway view taken from FIG. 2A of a portion of the aircraft 100 showing a landing gear support assembly 830 configured in accordance with an embodiment of the invention. In one aspect of this embodiment, the landing gear support assembly 830 includes a forward trunnion support 838 fixedly attached to a rear wing spar 806, and an aft trunnion support beam 832 attached at least proximate to the rear wing spar 806 outboard of the forward trunnion support 838. The aft trunnion support beam 832 extends at least generally aft from the rear wing spar 806 and includes an aft trunnion support 834 axially aligned with the forward trunnion support 838 along an axis 814. In other embodiments, the aft trunnion support beam 832 can be attached to the rear wing spar 806 inboard of the forward trunnion support 838.

As explained in greater detail below, a landing gear main strut 812 can be pivotally attached to the forward trunnion support 838 and the aft trunnion support 834 for pivotal motion about the axis 814 between a static deployed position as shown in FIG. 8 and a static retracted position folded inwardly toward the fuselage 102. The well-known structures and systems often used to pivotally move landing gear main struts between the static deployed and static retracted positions are not shown in FIG. 8 for purposes of clarity. In the static deployed position, the main strut 812 can position a wheel truck (not shown) below the wing 110 to movably support the aircraft 100 on the ground. Once airborne, the main strut 812 can be retracted inwardly about the axis 814 to stow the wheel truck within the corresponding wheel well 238 (FIG. 2A) for flight.

In another aspect of this embodiment, the landing gear support assembly 830 includes an inboard lateral support strut 840 and outboard lateral support struts 842 (shown as a first outboard lateral support strut 842a and a second outboard lateral support strut 842b). The outboard lateral support struts 842 can extend from the rear wing spar 806 to at least proximate the aft trunnion support 834. The inboard lateral support strut 840 can similarly extend from the fuselage 102 to at least proximate the aft trunnion support 834.

In a further aspect of this embodiment, the inboard lateral support strut 840 and the outboard lateral support struts 842 can transfer side loads from the main strut 812 to the fuselage 102 and the rear wing spar 806, respectively. The aft trunnion support beam 832 can transfer vertical loads from the main strut 812 into the rear wing spar 806. In other embodiments, other structural arrangements can be used to transfer loads from the main strut 812 into the wing 110 and/or the fuselage 102. For example, in another embodiment, the inboard lateral support strut 840 can be omitted and the outboard lateral support struts 842 can transfer the side loads from the main strut 812 to the rear wing spar 806. In yet another embodiment, the outboard lateral support struts 842 can be omitted and the inboard lateral support strut 840 can transfer the side loads from the main strut 812 to the fuselage 102.

Figure 9:
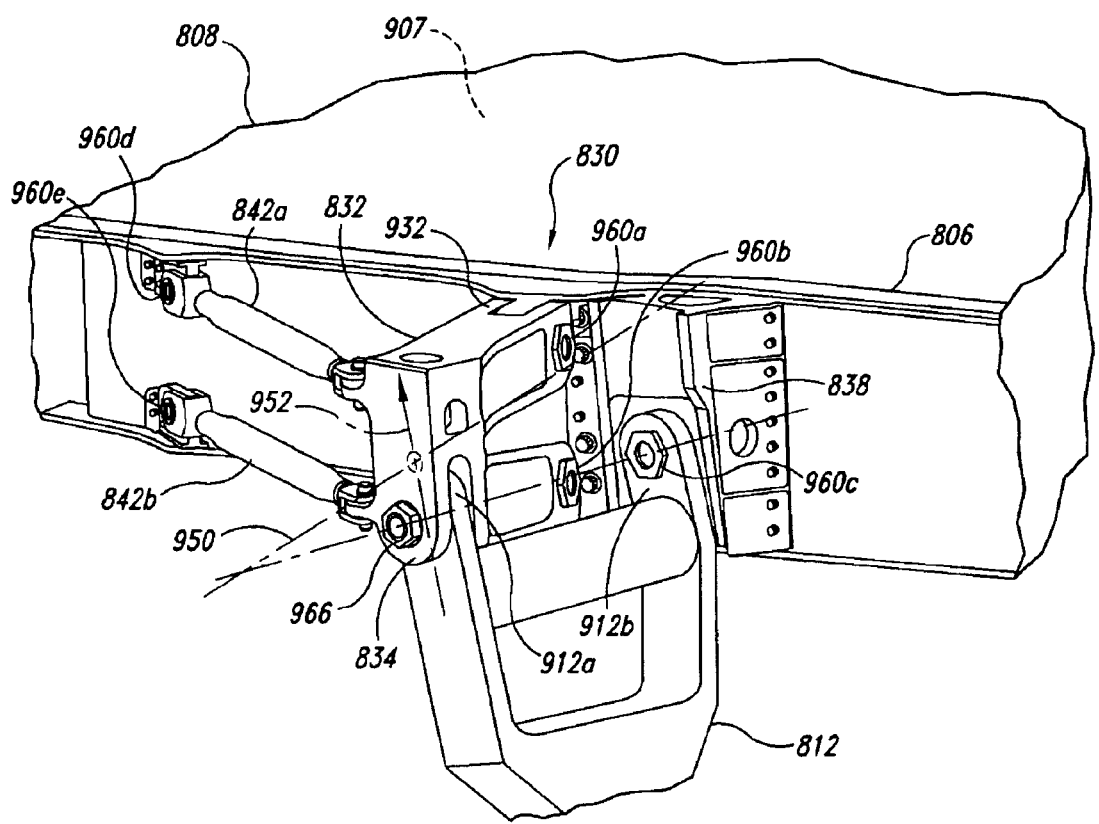
FIG. 9 is an enlarged top rear isometric view of the landing gear support assembly of FIG. 8.

FIG. 9 is an enlarged top rear isometric view of the landing gear support assembly 830 of FIG. 8. The inboard lateral support strut 840 (FIG. 8) has been removed for purposes of clarity. In one aspect of this embodiment, the aft trunnion support beam 832 includes a base portion 932 configured to be attached at least proximate to the rear wing spar 806, and a shear center axis 950 extending from the base portion 932 toward the aft trunnion support 834. The term "shear center axis" is used herein to describe an axis of the aft trunnion support beam 832 through which external forces can act without introducing torsional loads into the aft trunnion support beam 832. That is, external forces having lines of action that intersect the shear center axis 950 can only result in displacement of the aft trunnion support beam 832 and not twisting.

In another aspect of this embodiment, the aft trunnion support 834 is spaced apart from the base portion 932 and is configured to receive a pin 966 to pivotally support an aft pivot portion 912a of the main strut 812. When the main strut 812 is in the static deployed position as shown in FIG. 9, the aft pivot portion 912a exerts a resultant force against the aft trunnion support 834 along a line of action 952. The aft trunnion support 834 and the shear center axis 950 can be at least approximately aligned with the line of action 952. As a result, when the aft pivot portion 912a of the main strut 812 exerts a resultant force against the aft trunnion support 834 along the line of action 952, the line of action 952 will at least approximately intersect the shear center axis 950. Reducing or eliminating any offset between the line of action 952 and the shear center axis 950 can reduce or eliminate the torsional loads on the aft trunnion support beam 832. This reduction of torsional loads allows a corresponding reduction in the size and weight of the aft trunnion support beam 832.

In the illustrated embodiment, aligning the shear center axis 950 and the aft trunnion support 834 with the line of action 952 results in the aft trunnion support 834 being at least approximately vertically aligned with the shear center axis 950. In other embodiments, maintaining this alignment may cause the aft trunnion support 834 to be laterally offset relative to the shear center axis 950, depending on the angle of the main strut 812 in the deployed static position.

In a further aspect of this embodiment, the base portion 932 is attached to the rear wing spar 806 with a first fuse pin 960a and a second fuse pin 960b, both of which are positioned in vertical alignment with each other. In yet another aspect of this embodiment, a forward pivot portion 912b of the main strut 812 is pivotally attached to the forward trunnion support 838 with a third fuse pin 960c, and the outboard lateral support struts 842a and 842b are attached to the rear wing spar 806 with a fourth fuse pin 960d and a fifth fuse pin 960e, respectively. Accordingly, when the main strut 812 exerts a preselected force, such as an excessive or catastrophic landing force, against the aft trunnion support 834 along the line of action 952, the resulting bending load on the aft trunnion support beam 832 causes the fuse pins 960a and 960b, and subsequently the fuse pins 960c–e, to break and release the aft trunnion support beam 832, the main strut 812, and the outboard lateral support struts 842 from the rear wing spar 806. Releasing these components from the rear wing spar 806 in this manner prevents them from rupturing the rear wing spar 806 and causing a leak in a fuel tank 907 positioned on the opposite side of the rear wing spar 806 adjacent to the landing gear support assembly 830.

In other embodiments, other features can be used to provide the landing gear support assembly 830 with a break-away capability similar to that described above. For example, in another embodiment, high-strength bolts or pins (e.g., not fuse pins) can be used to attach the aft trunnion support beam 832 and the other components of the landing gear support assembly 830 to the rear wing spar 806. In this embodiment, a portion of the aft trunnion support beam 832 and similar portions of the other components can be undersized or otherwise configured to break in the event the aft trunnion support beam 832 experiences an excessive landing force.

One feature of embodiments of the invention shown in FIG. 9 is that the aft trunnion support 834 is positioned to cause the line of action 952 to at least approximately intersect the shear center axis 950 when the main strut 812 is in the static deployed position. An advantage of this feature is that the aft trunnion support beam 832 does not have to be sized to carry significant torsional loads and, accordingly, its weight can be reduced. Another feature of embodiments of the invention shown in FIG. 9 is that the placement of the fuse pins 960a–e allows the aft trunnion support 834 to be positioned at least approximately beneath the aft trunnion support beam 832 while still providing the landing gear support assembly 830 with the break-away capability described above. An advantage of this feature is that a potentially catastrophic landing event will not likely be further compounded by a ruptured fuel tank.

From the foregoing, it will be appreciated that specific embodiments of the invention have been described herein for purposes of illustration, but that various modifications may be made without deviating from the spirit and scope of the invention. Accordingly, the invention is not limited, except as by the appended claims.

What is claimed is:

1. An aircraft comprising:
   a fuselage, the fuselage having:
      a first fuselage portion with a first cross-sectional area;
      a second fuselage portion positioned aft of the first fuselage portion, the second fuselage portion having a second cross-sectional area that is less than the first cross-sectional area; and
      a third fuselage portion positioned aft of the second fuselage portion, the third fuselage portion having a third cross-sectional area that is greater than the second cross-sectional area;
   a wing fixedly attached to the fuselage and extending outwardly from a position at least proximate to the second fuselage portion, the wing having a leading edge region; and
   a propulsion system fixedly attached to the wing, the propulsion system having an air inlet positioned aft of the leading edge region of the wing, wherein the fuselage, wing, and propulsion system are configured to operate at a cruise Mach number of about 0.98 or less.

2. The aircraft of claim 1 wherein the propulsion system is at least approximately laterally aligned with the second fuselage portion.

3. The aircraft of claim 1 wherein the wing further includes a trailing edge region, and wherein the propulsion system further includes an exhaust gas outlet positioned aft of the trailing edge region of the wing.

4. The aircraft of claim 1 further comprising a landing gear pivotally attached to the wing, the landing gear including a wheel truck movable between a static deployed position for movably supporting the aircraft on the ground and a static retracted position for reducing aerodynamic drag in flight, wherein the static deployed position of the wheel truck is aft of the air inlet.

5. The aircraft of claim 1 wherein the leading edge region of the wing includes an outboard leading edge defining a first sweep angle with respect to the fuselage, and wherein the wing further includes an inboard leading edge, the inboard leading edge extending forward from the outboard leading edge to at least generally define a second sweep angle with respect to the fuselage, the second sweep angle being higher than the first sweep angle.

6. The aircraft of claim 1 wherein the wing leading edge region includes a wing leading edge, and wherein the air inlet of the propulsion system is positioned aft of the wing leading edge.

7. The aircraft of claim 1 wherein the fuselage, wing, and propulsion system are arranged to provide the aircraft with a generally smooth, monotonically changing, cross-sectional area distribution.

8. The aircraft of claim 1 further comprising at least first and second stabilizer surfaces extending outwardly from the third fuselage portion.

9. The aircraft of claim 1 further comprising at least first and second stabilizer surfaces extending outwardly from the third fuselage portion, the second stabilizer surface being positioned at least generally aft of the first stabilizer surface.

10. The aircraft of claim 1 further comprising:
a vertical stabilizer extending outwardly from the third fuselage portion; and
a horizontal stabilizer extending outwardly from the third fuselage portion, the horizontal stabilizer being positioned at least generally aft of the vertical stabilizer.

11. The aircraft of claim 1 wherein the wing further includes a trailing edge region, and wherein the aircraft further comprises a fuel tank portion positioned at least approximately within the third fuselage portion aft of the wing trailing edge region.

12. The aircraft of claim 1, further comprising:
a vertical stabilizer extending outwardly from the third fuselage portion; and
a fuel tank portion positioned at least approximately within the third fuselage portion proximate to the vertical stabilizer.

13. An aircraft comprising:
a fuselage, the fuselage including:
a first fuselage portion having a first maximum dimension transverse to a longitudinal axis of the aircraft;
a second fuselage portion positioned aft of the first fuselage portion, the second fuselage portion having a second maximum dimension transverse to the longitudinal axis of the aircraft, the second maximum dimension being less than the first maximum dimension; and
a third fuselage portion positioned aft of the second fuselage portion, the third fuselage portion having a third maximum dimension transverse to the longitudinal axis of the aircraft, the third maximum dimension being greater than the second maximum dimension;
a wing fixedly attached to the fuselage and extending outwardly from a position at least proximate to the second fuselage portion, the wing having a leading edge region; and
a propulsion system fixedly attached to the wing, the propulsion system having an air inlet positioned aft of the leading edge region of the wing, wherein the fuselage, wing, and propulsion system are configured to operate at a cruise Mach number of about 0.98 or less.

14. The aircraft of claim 13 wherein the first maximum dimension, the second maximum dimension, and the third maximum dimension are parallel to a yaw axis of the aircraft.

15. The aircraft of claim 13 wherein the first fuselage portion can accommodate at least six passenger seats positioned transversely across the first fuselage portion, and wherein the second fuselage portion can accommodate at least five passenger seats positioned transversely across the second fuselage portion.

16. The aircraft of claim 13 wherein the first fuselage portion includes first and second passenger aisles separating first, second, and third passenger seat sections.

17. The aircraft of claim 13, further comprising a passenger deck extending at least within the first, second, and third fuselage portions.

18. The aircraft of claim 13, further comprising:
a first passenger deck extending at least within the first, second, and third fuselage portions; and
a second passenger deck positioned below the first passenger deck.

19. The aircraft of claim 13, further comprising:
a passenger deck extending at least within the first, second, and third fuselage portions; and
a second deck positioned below the passenger deck, wherein the second deck is configured to carry at least two LD-3 cargo containers.

20. The aircraft of claim 13 wherein the leading edge region of the wing includes a wing leading edge, and wherein the air inlet of the propulsion system is positioned aft of the wing leading edge.

21. A near-sonic transport aircraft comprising:
a fuselage, the fuselage having:
a first fuselage portion with a first cross-sectional area configured to accommodate at least six passenger seats positioned transversely across the first fuselage portion;
a second fuselage portion positioned aft of the first fuselage portion, the second fuselage portion having a second cross-sectional area that is less than the first cross-sectional area and configured to accommodate at least five passenger seats positioned transversely across the second fuselage portion; and
a third fuselage portion positioned aft of the second fuselage portion, the third fuselage portion having a third cross-sectional area that is greater than the second cross-sectional area and configured to accommodate at least six passenger seats positioned transversely across the third fuselage portion;
a wing configured to operate efficiently at near-sonic airspeeds, the wing being fixedly attached to the fuselage and extending outwardly from a position at least proximate to the second fuselage portion, the wing having a leading edge region and a trailing edge region; and
a propulsion system fixedly attached to the wing, the propulsion system having an air inlet positioned aft of the leading edge region of the wing, the propulsion system further having an exhaust gas outlet positioned aft of the trailing edge region of the wing, wherein the fuselage, wing, and propulsion system are configured to operate at a cruise Mach number of about 0.98 or less.

22. The transport aircraft of claim 21 wherein the first fuselage portion has a first maximum dimension transverse to a longitudinal axis of the aircraft, wherein the second fuselage portion has a second maximum dimension transverse to the longitudinal axis of the aircraft, the second maximum dimension being less than the first maximum dimension, and wherein the third fuselage portion has a third maximum dimension transverse to the longitudinal axis of the aircraft, the third maximum dimension being greater than the second maximum dimension.

23. The transport aircraft of claim 21 wherein the first fuselage portion has a first maximum dimension parallel to a yaw axis of the aircraft, and the second fuselage portion has a second maximum dimension parallel to the yaw axis, of the aircraft, the second maximum dimension being less than the first maximum dimension.

24. The transport aircraft of claim 21 further comprising:
a first passenger deck extending at least within the first, second, and third fuselage portions; and
a second passenger deck positioned below the first passenger deck and extending at least within the first fuselage portion.

25. The transport aircraft of claim 21 wherein wing further includes a wing spar box, and further comprising a landing gear pivotally attached to the wing at least generally aft of the wing spar box, the landing gear including a wheel truck movable between a static deployed position for movably supporting the aircraft on the ground and a static retracted position for reducing aerodynamic drag in flight, wherein the static deployed position of the wheel truck is aft of the air inlet.

26. The transport aircraft of claim 21 wherein wing further includes a wing spar box, and further comprising a landing gear pivotally attached to the wing at least generally aft of the wing spar box, the landing gear including a wheel truck movable between a static deployed position for movably supporting the aircraft on the ground and a static retracted position for reducing aerodynamic drag in flight, wherein the wheel truck is stored in a wheel well positioned at least generally in the second fuselage portion when the wheel truck is in the static retracted position.

27. A method for manufacturing near-sonic aircraft, the method comprising:
 providing a first fuselage portion having a first cross-sectional area;
 attaching a second fuselage portion to the first fuselage portion aft of the first fuselage portion, the second fuselage portion having a second cross-sectional area that is less than the first cross-sectional area;
 attaching a third fuselage portion to the second fuselage portion aft of the second fuselage portion, the third fuselage portion having a third cross-sectional area that is greater than the second cross-sectional area, the first, second, and third fuselage portions forming a fuselage;
 attaching a wing at least proximate to the second fuselage portion, the wing having a leading edge region and extending at least generally outward from the second fuselage portion; and
 attaching a propulsion system to the wing, the propulsion system having an air inlet positioned aft of the leading edge region of the wing, wherein the fuselage, wing, and propulsion system are configured to operate at a cruise Mach number of about 0.98 or less.

28. The method of claim 27 wherein the wing leading edge region includes a wing leading edge, and wherein attaching a propulsion system to the wing includes positioning the air inlet of the propulsion system aft of the wing leading edge.

29. The method of claim 27 wherein attaching a propulsion system to the wing includes positioning an engine nacelle under the wing at least approximately laterally aligned with the second fuselage portion.

30. The method of claim 27 wherein the wing further includes a trailing edge region, and wherein attaching a propulsion system to the wing includes positioning an exhaust gas outlet aft of the trailing edge region of the wing.

31. The method of claim 27, further comprising:
 attaching a first stabilizer surface to the fuselage at least proximate to the third fuselage portion; and
 attaching a second stabilizer surface to the fuselage at least proximate to the third fuselage portion, wherein the first stabilizer surface extends outwardly from the fuselage at a first location and the second stabilizer surface extends outwardly from the fuselage at a second location that is longitudinally offset from the first location.

32. The method of claim 27 further comprising:
 attaching a vertical stabilizer to the fuselage at least proximate to the third fuselage portion; and
 positioning a fuel tank portion at least approximately within the third fuselage portion proximate to the vertical stabilizer.

* * * * *